United States Patent [19]

Hunt

[11] 4,438,940
[45] Mar. 27, 1984

[54] PORTABLE ICE FISHING ENCLOSURE

[76] Inventor: Frederick J. Hunt, 3224 Garden, Royal Oak, Mich. 48072

[21] Appl. No.: 368,167

[22] Filed: Apr. 14, 1982

[51] Int. Cl.³ .............................................. B62B 15/00
[52] U.S. Cl. ................................ 280/12 S; 280/12 C; 297/184
[58] Field of Search ................. 280/12 C, 12 M, 12 S, 280/30, 32; 224/151, 155; 297/184

[56] References Cited

U.S. PATENT DOCUMENTS

| | | | |
|---|---|---|---|
| 2,465,147 | 3/1949 | Butler et al. | 280/12 S |
| 2,661,959 | 12/1953 | Bell | 297/184 X |
| 2,780,471 | 2/1957 | Lempke | 280/12 S |
| 2,907,601 | 10/1959 | Kuchenbecker et al. | 280/30 X |
| 3,352,313 | 11/1967 | Kroening | 280/12 S |
| 3,762,767 | 10/1973 | Powell | 297/184 X |
| 3,820,805 | 6/1974 | Tuomala | 280/12 S |
| 3,854,746 | 12/1974 | Flynn et al. | 280/12 S |
| 3,971,395 | 7/1976 | Lipinski | 280/12 S X |

Primary Examiner—Joseph F. Peters, Jr.
Assistant Examiner—Michael Mar
Attorney, Agent, or Firm—Krass, Young & Schivley

[57] ABSTRACT

A combination sled and shelter device for use while ice-fishing or the like comprising a drumshaped container body disposed on a pair of snow runners and having doors in the cylindrical drum surface. To use the device as a shelter, one stands the device on the runner ends and sits within the container body.

15 Claims, 4 Drawing Figures

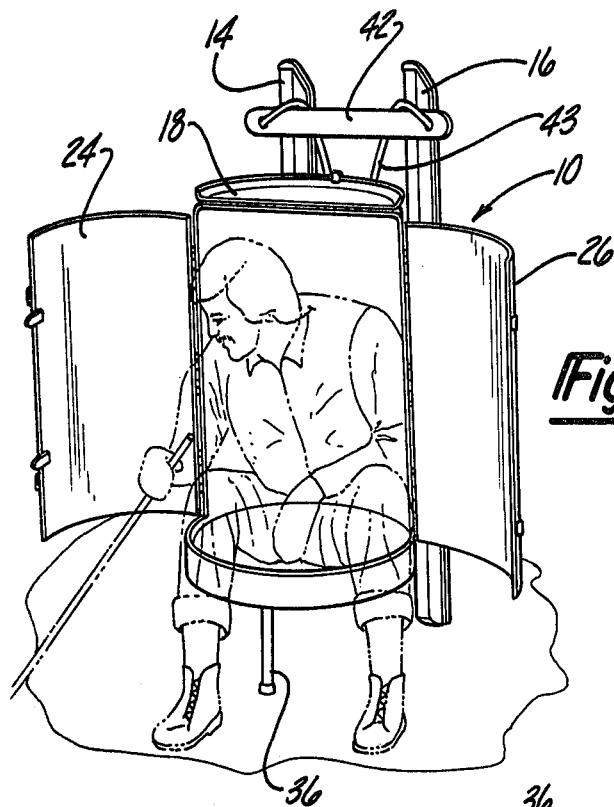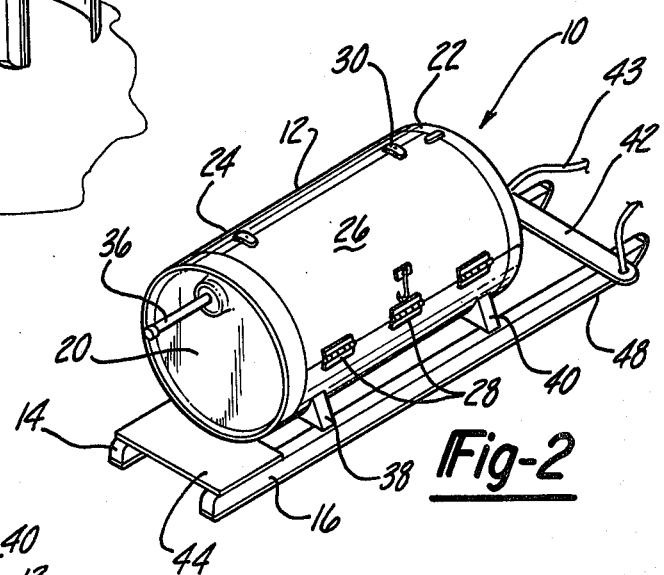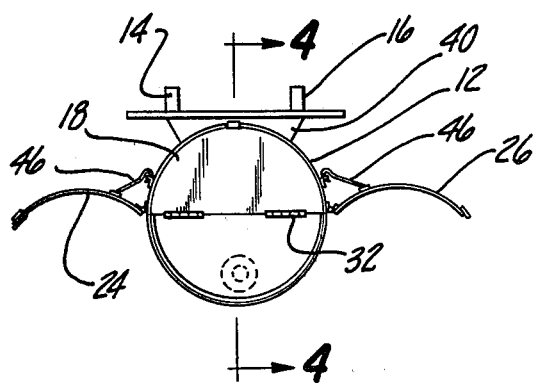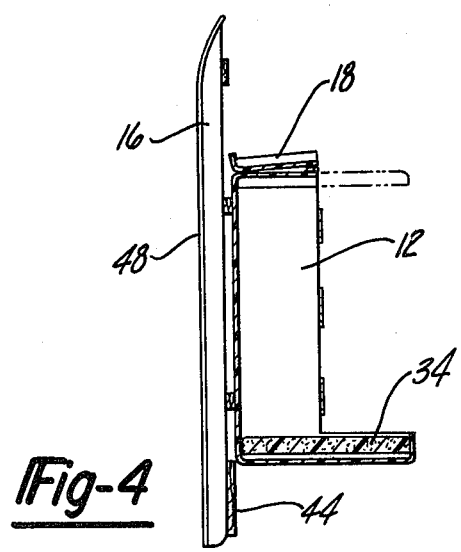

PORTABLE ICE FISHING ENCLOSURE

DESCRIPTION

1. Technical Field

The present invention relates to portable shelters which are used by sportsmen in harsh weather conditions and particularly to a device which in a transportation mode assumes one orientation and in a shelter mode assumes another orientation and which does not require substantial assembly or reconfiguration in going from one use mode to the other.

2. Background Art

Outdoor sportsmen frequently encounter situations in which transportation of equipment must be accomplished to a remote site during periods of inclement or cold weather. Once at the destination, an easily used shelter not requiring substantial assembly or reconfiguration is desirable.

One approach to this problem is illustrated in U.S. Pat. No. 2,465,147 to Butler et al. This patent discloses a collapsible windbreak which in its collapsed configuration functions as a sled and provides a surface on which to place items to be transported. Once at its destination, the sled is placed on edge and unfolded to function as a windbreak. A significant amount of assembly is required to fully reconfigure the device from sled to windbreak form.

U.S. Pat. No. 2,780,471 to Lempke, discloses a portable knockdown structure which combines a sled feature with that of a structure intended for use as shelter while ice fishing or the like. Again a substantial assembly step is required.

U.S. Pat. No. 3,820,805 Tuomala, discloses an assembly of components which may be put together in one way to provide a sled for transport means and in another way to form a shelter to be used while ice fishing or the like.

U.S. Pat. No. 3,971,395 Lipinski, discloses a collapsible self-storing structure which folds for transportation to the use site. Again the structure is intended for use as a shelter while ice fishing.

While each of the above devices satisfy the functional intent of providing shelter, they each suffer from a common shortcoming in that they all require assembly or modification of form before they become useful as a shelter. In each case, the mass of the structure is substantial and considerable unfolding or construction is required. All intend that transportation be via skis or runners which are integral parts of the structure or that may be constructed from included components.

Accordingly, there remains a need for a device which provides both easy, convenient transportation and immediately available shelter without the need for substantial assembly or reconfiguration procedures.

SUMMARY OF THE INVENTION

In accordance with the invention, a device is provided which is easily and conveniently transported over, for example, ice or snow and which readily converts to a shelter mode simply by standing the device on end.

In general, the device comprises the combination of a container body and ground engaging means such as runners. In the transportation mode, the device rests on the ground engaging means with the longitudinal axis of the container body horizontal. In the shelter mode, the device is placed on end so that the longitudinal axis is vertical.

In the preferred form, the container body is a cylindrical drum having one or more doors which are opened to remove any goods being carried and to afford accommodation for a human occupant in a seated position. The seat is provided by or on the base of the drum and is supported at convenient elevation by the stable combination of the runner ends and a support leg.

BRIEF DESCRIPTION OF THE DRAWINGS

FIG. 1 is a perspective view of a preferred embodiment of the invention in the shelter mode;

FIG. 2 is a perspective view of the embodiment in the transportation mode;

FIG. 3 is a top view of the embodiment with doors open; and

FIG. 4 is a sectional view through section line 4—4 of FIG. 3 showing interior details.

DETAILED DESCRIPTION OF THE PREFERRED EMBODIMENT

Referring to the drawings, there is shown a combination sled and shelter-providing device 10 comprising as principal components a cylindrical container body 12 and a pair of spaced parallel ground engaging runners 14, 16 to facilitate transportation of the device 10 over snow and ice. The container body 12 comprises circular top 18 and bottom 20 and a cylindrical wall portion 22 and is of such size and interior volume as to accommodate the upper body portion of a human occupant in a seated position as illustrated by broken line drawing in FIG. 1.

The container body 12 has formed therein a pair of doors 24, 26 which are hinged at 28 to swing outwardly and open approximately half of the frontal area of the container body as best shown in FIGS. 1 and 3. Suitcase-type clasps 30 are provided between the mating edges of the doors 24, 26 to maintain them in the closed condition as best shown in FIG. 2. The top 18 may also be divided along a diameter and hinged at 32 so as to fold back and provide added headroom for the human occupant.

A circular foam seat cushion 34 having a covering of vinyl, leather or suitable fabric is secured such as by screws or adhesive to the interior surface of the bottom 20 as shown in FIG. 4 to provide comfort for the human occupant once seated within the container body 12. The surfaces of the doors 24, 26 preferably extend along the longitudinal axis of the container body 12 sufficiently so as to be substantially flush with the seat 34 so as to avoid contact with the bottom of the human occupant's thighs as well as to maximize access to the interior volume of the container body.

As illustrated in the drawings, the runners 14, 16 exceed the overall longitudinal dimension or size of the container body 12 so as to extend longitudinally beyond the container body 12 at both ends. Longitudinal axis of the container body is substantially parallel to the runners 14, 16 and therefore assumes the same spatial attitude as the runners in the various modes of use as hereinafter described.

A support leg 36 of steel or other rigid material is affixed such as by a threaded connection to the bottom 20 of the container body 12 to provide stable support when in the shelter mode illustrated in FIG. 1. Therefore the effective length of the leg 36 equals the length by which the runners 14, 16 extend longitudinally beyond the bottom surface 20 for obvious reasons.

The container body 12 is secured to and between the runners 14, 16 by means of lateral supports 38, 40. An additional cross member 42 may be affixed to and extend between the runners 14, 16 for additional lateral support and also to receive a tow rope 43 to facilitate towing the device 10 over the ground. A second cross plate 44 is provided adjacent the bottom 20 of the container body 12 to provide a convenient platform for carrying goods such as bait cans, tackle boxes and the like. Cross plate 44 also provides additional lateral support and rigidity for the overall structure.

By way of detail, hook-and-eye fasteners 46 may be provided between the doors 24, 26 and the container body 12 to hold the doors in the open condition when using the shelter mode. The container body 12 is preferably made from a new or used molded plastic 55 gallon drum, such article being preferred and recommended because of its appropriate size and interior volume, because of its availability and because of the fact that such a device is configured so as to have a threaded bung which readily accommodates the support leg 36; however, it is to be understood that the container body 12 may take various forms and may be custom manufactured for the particular use described herein. The metal work including hinges 28, 32 and the fasteners 46, are preferably plated metal or stainless steel so as to minimize the tendency to rust under outdoor usage conditions. The runners 14, 16 and the various cross members 38, 40, 42 and 44 may be constructed from wood such as pine and the runners 14, 16 may be clad with aluminum or other smooth low friction metal as shown at 48 to reduce friction over the ground as well as to extend the useful life of the runners.

Although the operation of the device is believed to be apparent from the drawings, the transportation mode involves placing the longitudinal axis of the container in a horizontal position such that the runners 14, 16 contact the ground. In this orientation the interior of container body 12 may be used to carry gear and the device may either be towed by hand or behind a snow vehicle or tractor. When reaching the use site, the device is simply placed on end such that the longitudinal axis is vertical. In this orientation a three-point support is provided by the rearward end surfaces of runners 14, 16 and by the support leg 36. A foot may be provided on the end of the support leg 36 to prevent the leg from sinking into the ice when the device is used for ice fishing. It is apparent that no assembly or reconfiguration step is required to convert the device from the transportation mode to the shelter mode; i.e., one simply opens the doors 24, 26 and seats oneself within the protective confines of the container body 12 when shelter is desired.

A number of modifications will be apparent to those skilled in the art. For example, the container body 12 may be variously configured and assume various shapes and sizes so long as the basic function of providing shelter for a human occupant is provided. The doors 24, 26 may also be variously configured; i.e., a single door of solid rigid material such as plastic may be provided by cutting the door out of the container body or, alternatively, an opening may be provided in the container and this opening can be covered by means of a fabric door which is simply taken down or removed for use of the device as a shelter. The runners 14, 16 may be formed of plastic or other suitable rigid material and the cross pieces 38, 40 might be eliminated in favor of an integral molded-in set of legs on the container body 12. The running gear may be modified to provide wheels in addition to or instead of the runners 14, 16 for transportation over surfaces other than snow and ice. These modifications are given by way of example and others will be apparent to persons reading the foregoing specification.

I claim:

1. A transport apparatus for carrying goods in one orientation and providing shelter in another orientation, comprising:
    a container body having base and wall portions and being of such size and interior volume as to accommodate at least the trunk portion of a human therein;
    ground engaging means for facilitating movement of said body over a ground surface, said ground engaging means being connected to said body for transport operation with said wall portion in a horizontal orientation;
    support means connected to the base portion of the body for stably supporting said body in a shelter position wherein the wall portion is vertically oriented and the base portion is spaced above the ground surface to provide comfortable seating for a human,
    said ground engaging means being configured to slide said apparatus over snow and ice and functioning with said support means to support the apparatus on end with the wall portion of said apparatus in an upright and vertical position.

2. A transport apparatus as defined in claim 1 further comprising closure means of said container body.

3. A transport apparatus as defined in claim 2 wherein said closure means comprises:
    at least one rigid door conforming to said wall portion and attached thereto.

4. A transport apparatus as defined in claim 3 further comprising means for maintaining said doors in an open position.

5. A transport apparatus as defined in claim 1 further comprising a top affixed to said container body.

6. A transport apparatus as defined in claim 5 further comprising hinge means for pivoting at least a portion of said top of said container upward.

7. A transport apparatus as defined in claim 1 wherein said body portion is cylindrical in shape.

8. A transport apparatus as defined in claim 7 wherein the body is made of plastic material.

9. A transport apparatus as defined in claim 1 wherein said ground engaging means comprises a pair of spaced, parallel runners attached to said container body.

10. A transport apparatus as defined in claim 9 wherein at least the ground-engaging portion of said runners is made from metal.

11. A transport apparatus as defined in claim 1 wherein said support means further comprised a single leg attached to said base portion of said container body.

12. A transport apparatus as defined in claim 11 wherein said leg further comprises a foot attached to the free end of the leg to provide a load distribution surface for said leg.

13. A transport apparatus as defined in claim 1 further comprising a padded seat disposed within said container body on said base and made to conform to the interior configuration of said base of said container.

14. A transport apparatus as defined in claim 1 further comprising a platform attached to said support means in order to provide increased goods transporting capability.

15. A combination sled and shelter for use in outdoor activities comprising in combination:
- a closed container having a longitudinal axis, top and bottom ends spaced apart along said axis and an intermediate wall structure, said container being of sufficient interior volume as to accommodate therein at least the trunk and upper body portions of a human occupant;
- runner means attached to said container parallel to said axis for transportation over snow with the container axis horizontal, said runner means being of greater longitudinal length than the container so as to extend beyond at least the bottom end;
- at least one door on the container wall structure to provide access to the interior and sufficient opening area as to permit entry by at least the trunk and upper body portion of a human;
- and a support leg attached to the bottom end and substantially coextensive with the portion of the runner means which extends beyond the bottom end of the container to cooperate with the runner means in permitting the sled to stand on end with the container spaced above the ground surface;
- said door being substantially flush with the bottom and whereby a human occupant may sit on the bottom end while in the container.

* * * * *